(12) United States Patent
Balcacer

(10) Patent No.: US 12,082,734 B1
(45) Date of Patent: Sep. 10, 2024

(54) AUTOMATIC LEMON SQUEEZER

(71) Applicant: Flavia Balcacer, Ft Lauderdale, FL (US)

(72) Inventor: Flavia Balcacer, Ft Lauderdale, FL (US)

( * ) Notice: Subject to any disclaimer, the term of this patent is extended or adjusted under 35 U.S.C. 154(b) by 0 days.

(21) Appl. No.: 18/496,879

(22) Filed: Oct. 29, 2023

(51) Int. Cl.
*A47J 19/02* (2006.01)

(52) U.S. Cl.
CPC ..................... *A47J 19/02* (2013.01)

(58) Field of Classification Search
CPC .......... A23N 1/003; B30B 1/18; B30B 1/181; B30B 9/02; B30B 9/04; B30B 9/042; B30B 9/045; B30B 9/3064; A47J 19/02; A47J 19/023
USPC ................. 100/104, 131, 208, 213
See application file for complete search history.

(56) References Cited

U.S. PATENT DOCUMENTS

| | | | | |
|---|---|---|---|---|
| 2,629,317 A | * | 2/1953 | Nelson ................... | A23N 1/003 99/507 |
| 2,649,730 A | * | 8/1953 | Hait ....................... | A23N 1/003 414/652 |
| 2,723,618 A | * | 11/1955 | Matthews ................ | B30B 9/22 100/282 |
| 11,058,247 B1 | * | 7/2021 | Balcacer ................ | A23N 1/003 |
| 2019/0261804 A1 | * | 8/2019 | Balcacer ................. | B30B 1/04 |

FOREIGN PATENT DOCUMENTS

| | | | | |
|---|---|---|---|---|
| CN | 107232958 A | * | 10/2017 | |
| DE | 102008060043 B3 | * | 7/2010 | ............ B30B 1/181 |
| GB | 2453353 A | * | 4/2009 | ............ A23N 1/003 |
| WO | WO-2018055562 A1 | * | 3/2018 | ............ A47J 19/023 |

* cited by examiner

*Primary Examiner* — Christopher L Templeton
*Assistant Examiner* — P Derek Pressley
(74) *Attorney, Agent, or Firm* — Ruben Alcoba, esq.

(57) ABSTRACT

An automatic lemon squeezer comprises of a frame. A controller attaches to the frame. A top tray attaches to the frame, the top tray defines a plurality of paraboloid receivers. Four lead screw actuators attach to the bottom side of the frame and to the top side of the frame. Four motors attach to the four led screw actuators and are controlled by the controller. A press support mounts on the four led screw actuators. A rectangular pan rests on the press support and defines a plurality of paraboloids and a drain. A left spring system attaches to the left side of the rectangular pan. A right spring system attaches to the right side of the rectangular pan. A compressing tray rests above a middle support of the left spring system and a middle support of the right spring system. And, a cover attaches to the frame.

9 Claims, 6 Drawing Sheets

AUTOMATIC LEMON SQUEEZER

BACKGROUND

The present invention is directed to an automatic lemon squeezer.

The present invention is an improvement of the inventor's prior issued patents. The patents were lemon squeezers that required the user to expend manual force to squeeze the lemons.

The inventor realized that there are individuals who cannot use her prior inventions because of the force that is required to squeeze the lemons.

Her realization led her to conceive the present invention, a compact and lightweight automatic lemon squeezer that squeezes lemons with a simple push of a button.

For the foregoing reason, there is a need for an automatic lemon squeezer that will not require a user to use manual force to squeeze a plurality of lemons.

SUMMARY

The present invention is an automatic lemon squeezer that does not require a user's force to squeeze lemons.

The automatic lemon squeezer comprises of a rectangular frame. A controller attaches to the frame. A top tray that attaches to the frame; the top tray defines a plurality of paraboloid receivers. Four lead screw actuators attach to the bottom side of the frame and to the top side of the frame. Four motors attach to the four led screw actuators and are controlled by the controller. A press support mounts on the four led screw actuators. A rectangular pan defines a plurality of paraboloid and a drain. A left spring system attaches to the left side of the rectangular pan. A right spring system attaches to the right side of the rectangular pan. A compressing tray rests above a middle support of the left spring system and a middle support of the right spring system. And, a cover attaches to the frame.

An object of the present invention is to provide an automatic lemon squeezer that does not require a user's force to squeeze lemons.

Another object of the present invention is to provide an automatic lemon squeezer that is compact and lightweight.

DRAWINGS

These and other features, aspects, and advantages of the present invention will become better understood with regards to the following description, appended claims, and drawings where:

DESCRIPTION

Figure 1:
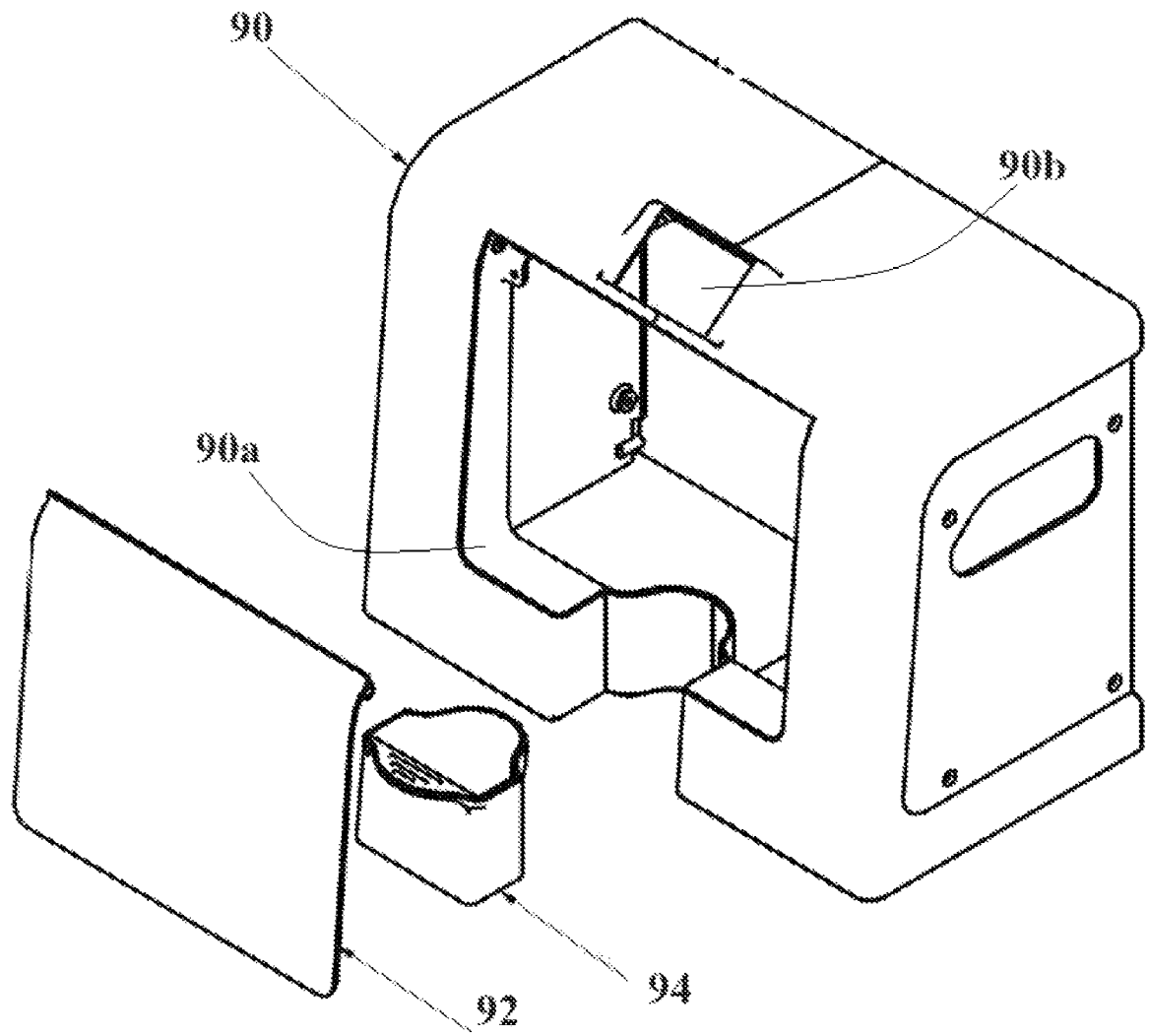
FIG. 1 is an exploded perspective right view of the frame, cover, and collection cup of the present invention.
Figure 2:
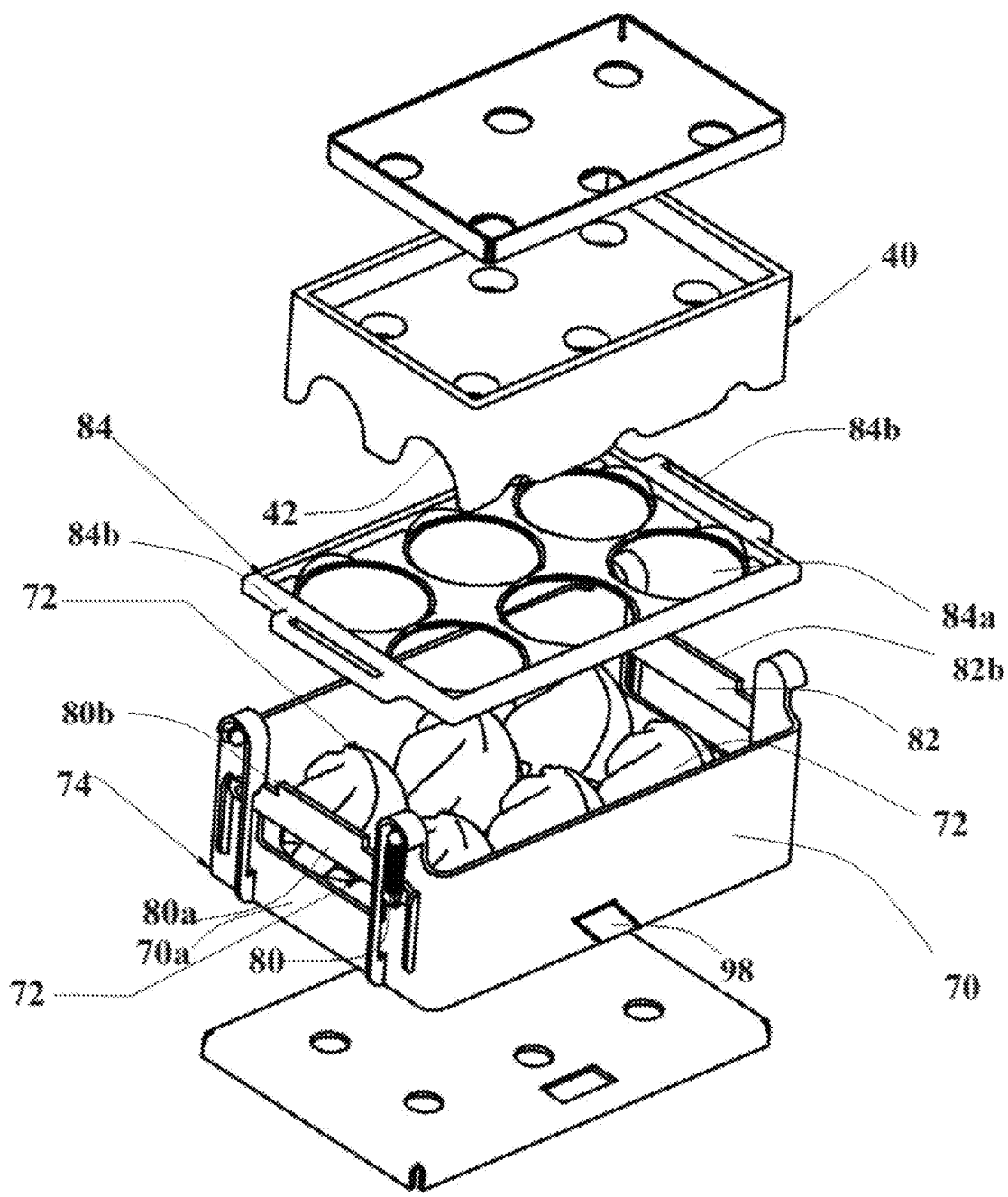
FIG. 2 is an exploded perspective left view of the compressing plates of the present invention.
Figure 3:
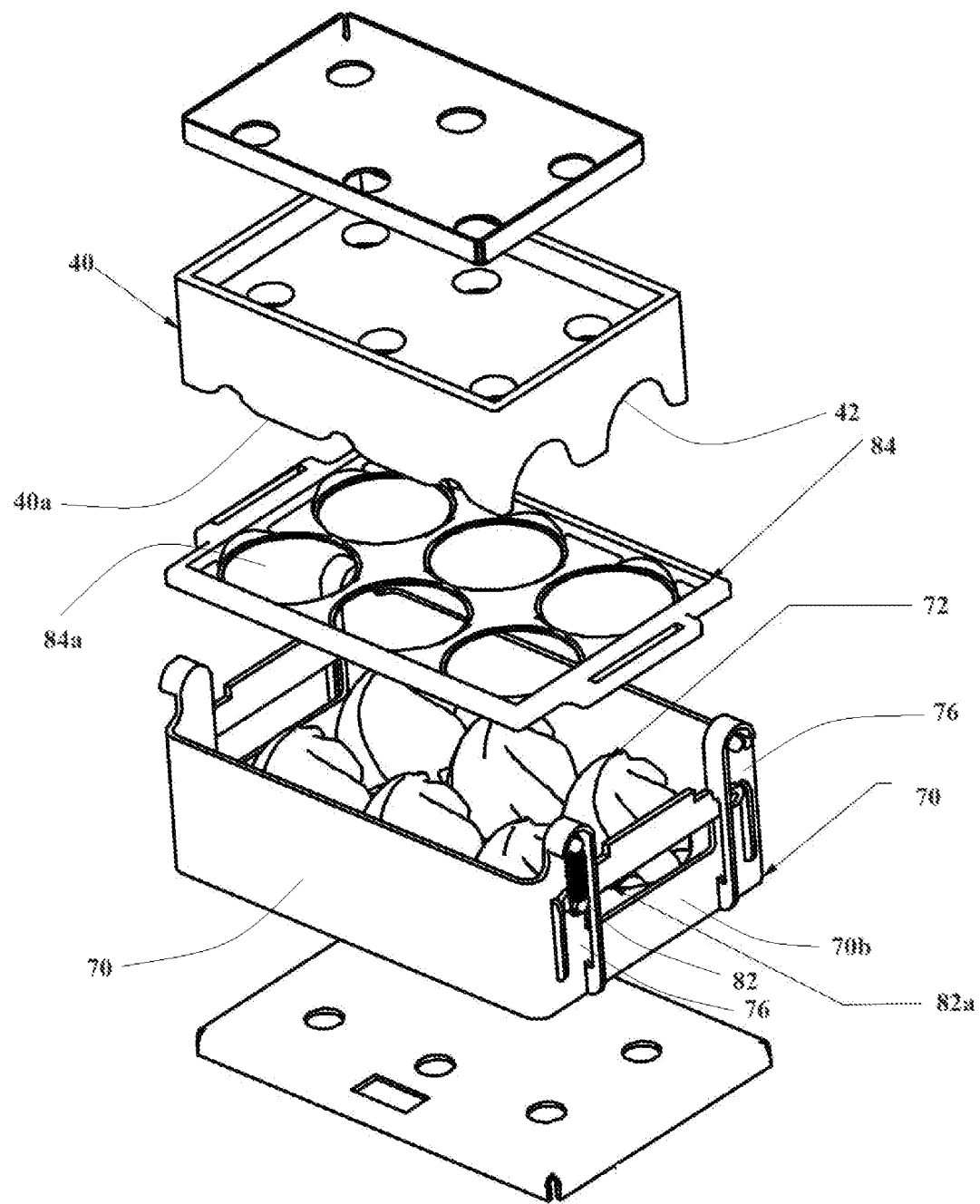
FIG. 3 is an exploded perspective right view of the compressing plates of the present invention.
Figure 4:
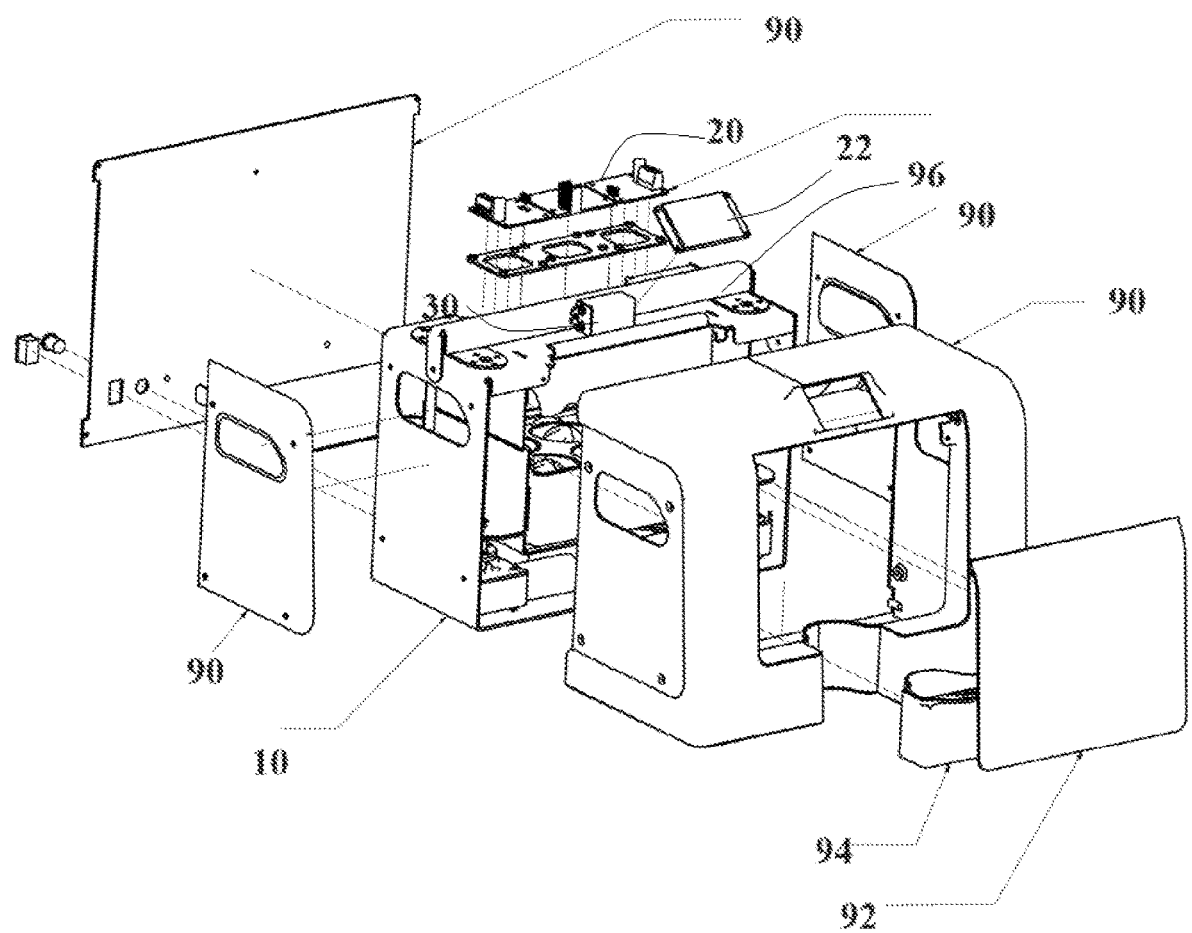
FIG. 4 is an exploded left perspective view of the present invention.
Figure 5:
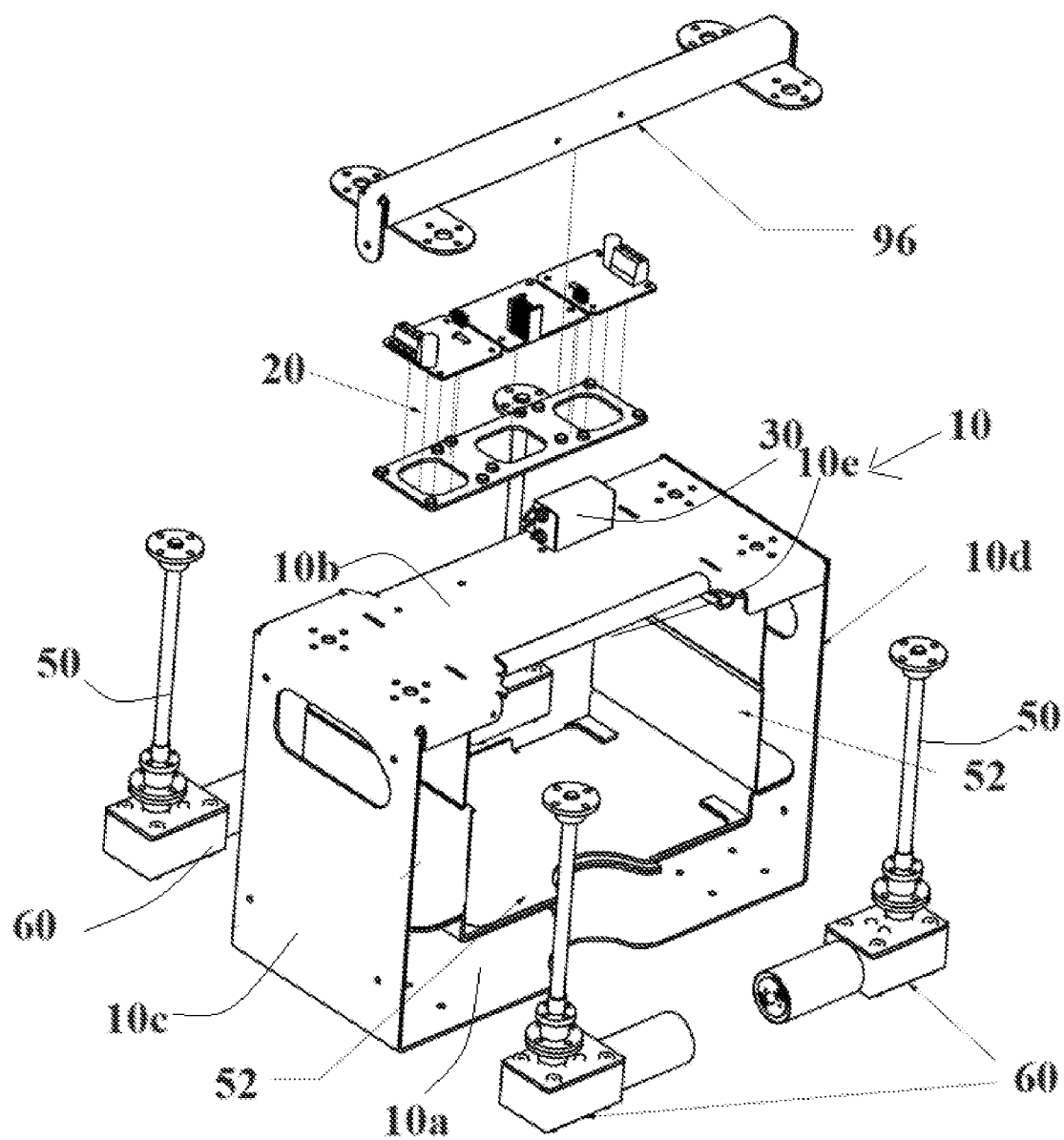
FIG. 5 is an exploded view of the mechanical system of the present invention.
Figure 6:
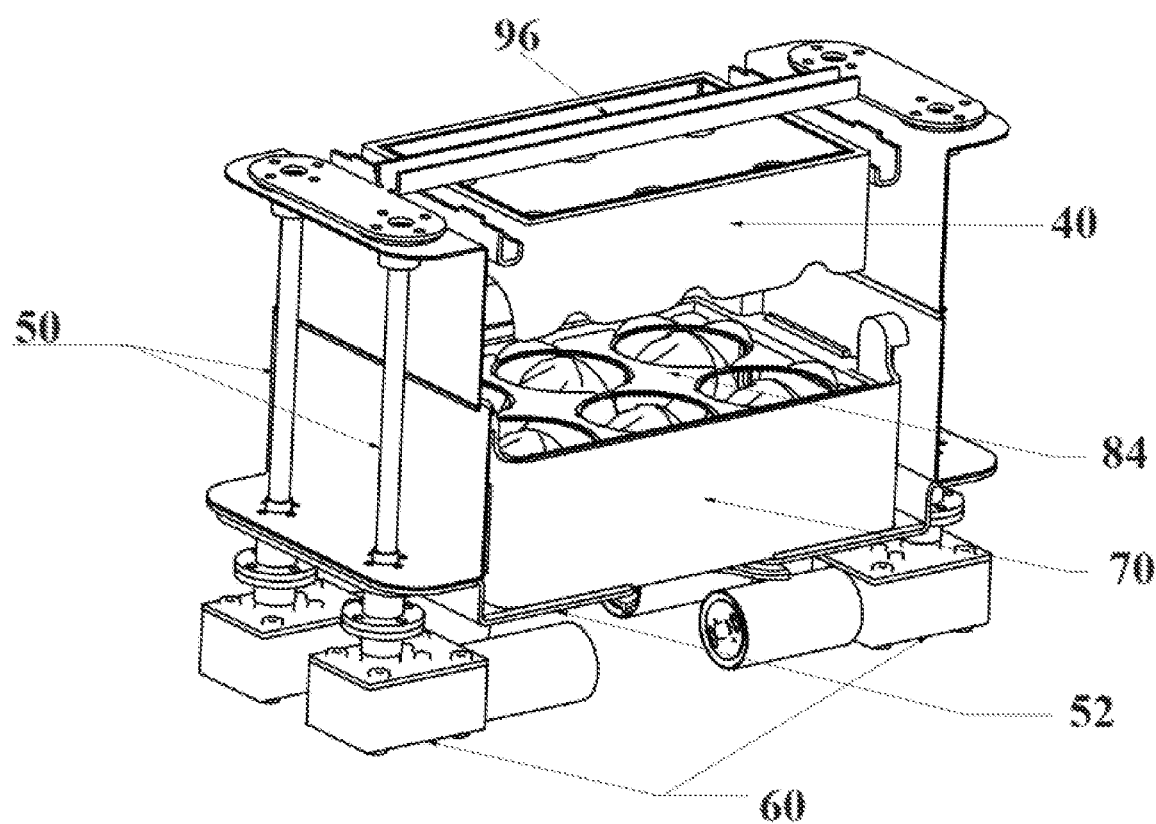
FIG. 6 is an exploded view of the mechanical system of the present invention when it is mounted on the frame.

As seen in FIGS. 1-6, The present invention is directed to an automatic lemon squeezer that does not require a user's force to squeeze lemons.

The automatic lemon squeezer comprises a rectangular frame 10 that has a bottom 10a, a top 10b, a left 10c, and a right side 10d. A controller 20 attaches to the top side 10b of the rectangular frame 10, the controller 20 also attaches to a power source 30. A top tray 40 attaches to a bottom side 10e of the top side 10b of the rectangular frame 10, the top tray 40 defines a plurality of paraboloid receivers 42 on a bottom side 40a of the top tray 40. Four lead screw actuators 50, each of the four lead screw actuators 50 attaches to each corner of the bottom side 10a of the rectangular frame 10 and to each corner of the top side 10b of the rectangular frame 10. Four motors 60 attach to the four lead screw actuators 50, the four motors 60 are operatively connected to the controller 20. A press support 52 mounts on the four lead screw actuators 50. A rectangular pan 70 that defines a plurality of paraboloids 72 that extend upward, the rectangular pan 70 defines two left lateral channels 74 on a left side 70a of the rectangular pan 70 and two right lateral channels 76 on a right side 70b of the rectangular pan 70, the rectangular pan 70 defines a drain 98, the rectangular pan 70 rests on the press support 52. A left spring system 80 is placed within the left lateral channels 74 of the rectangular pan 70. A right spring system 82 is placed within the right lateral channels 76 of the rectangular pan 70. A compressing tray 84 that defines a plurality of apertures 84a and a pair of pressure stabilizing receiving linear apertures 84b, the compressing tray 84 rests above a middle support 80a of the left spring system 80 and a middle support 82a of the right spring system 82, the middle support 80a of the left spring system 80 defines an upward linear stabilizer 80b that inserts within one of the pair of pressure stabilizing receiving linear apertures 84, the middle support 82a of the right spring system 82 defines an upward linear stabilizer 82b that inserts within one of the pair of pressure stabilizing receiving linear apertures 84, the plurality of the paraboloid receivers 42, the plurality of paraboloids 72 that extend upward, and the plurality of apertures 84a of the compressing tray 84 are configured to be linearly aligned when the automatic lemon squeezer is operational. And, a cover 90 that defines a front rectangular aperture 90a and a top controller aperture 90b, the cover 90 attaches to the rectangular frame 10, a hinged door 92 attaches the front rectangular aperture, and a display 22 of the controller 20 is placed within the top controller aperture 90b.

In an embodiment of the present invention, the automatic lemon squeezer comprises of a collection cup 94 that is placed below the drain 98.

In another embodiment of the present invention, the automatic lemon squeezer comprises of a top reinforcement 96 that is attached to the top 10b of the rectangular frame 10.

In still another embodiment of the present invention, the rectangular frame 10 is made of metal.

In yet still another embodiment of the present invention, the power source 30 is a rechargeable battery.

In a further embodiment of the present invention, the press support 52 is made of metal.

An advantage of the present invention is that it provides an automatic lemon squeezer that does not require a user's force to squeeze lemons.

Another advantage of the present invention is that it provides an automatic lemon squeezer that is compact and lightweight.

While the inventor's description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. An automatic lemon squeezer that does not require a user's force to squeeze lemons, the automatic lemon squeezer comprises:

a rectangular frame that has a bottom, a top, a left and a right side;

a controller attaches to the top side of the rectangular frame, the controller also attaches to a power source;

a top tray attaches to a bottom side of the top side of the rectangular frame, the top tray defines a plurality of paraboloid receivers on a bottom side of the top tray;

four lead screw actuators, each of the four lead screw actuator attaches to each corner of the bottom side of the rectangular frame and to each corner of the top side of the rectangular frame;

four motors attach to the four lead screw actuators, the four motors are operatively connected to the controller;

a press support mounts on the four lead screw actuators;

a rectangular pan that defines a plurality of paraboloids that extend upward, the rectangular pan defines two left lateral channels on a left side of the rectangular pan and two right lateral channels on a right side of the rectangular pan, the rectangular pan defines a drain, the rectangular pan rests on the press support;

a left spring system that is placed within the left lateral channels of the rectangular pan;

a right spring system that is placed within the right lateral channels of the rectangular pan;

a compressing tray that defines a plurality of apertures and a pair of pressure stabilizing receiving linear apertures, the compressing tray rests above a middle support of the left spring system and a middle support of the right spring system, the middle support of the left spring system defines an upward linear stabilizer that inserts within one of the pair of pressure stabilizing receiving linear apertures, the middle support of the right spring system defines an upward linear stabilizer that inserts within one of the pair of pressure stabilizing receiving linear apertures, the plurality of the paraboloid receivers, the plurality of paraboloids that extend upward, and the plurality of apertures of the compressing tray are configured to be linearly aligned when the automatic lemon squeezer is operational; and a cover that defines a front rectangular aperture and a top controller aperture, the cover attaches to the rectangular frame, a hinged door attaches the front rectangular aperture, and a display of the controller is placed within the top controller aperture.

2. The automatic lemon squeezer that does not require the user's force to squeeze lemons of claim 1, the automatic lemon squeezer comprises of a collection cup that is placed below the drain.

3. The automatic lemon squeezer that does not require the user's force to squeeze lemons of claim 2, the automatic lemon squeezer comprises of a top reinforcement that is attached to the top of the rectangular frame.

4. The automatic lemon squeezer that does not require the user's force to squeeze lemons of claim 3, wherein the rectangular frame is made of metal.

5. The automatic lemon squeezer that does not require the user's force to squeeze lemons of claim 4, wherein the power source is a rechargeable battery.

6. The automatic lemon squeezer that does not require the user's force to squeeze lemons of claim 1, the automatic lemon squeezer comprises of a top reinforcement that is attached to the top of the rectangular frame.

7. The automatic lemon squeezer that does not require the user's force to squeeze lemons of claim 1, wherein the rectangular frame is made of metal.

8. The automatic lemon squeezer that does not require the user's force to squeeze lemons of claim 1, wherein the power source is a rechargeable battery.

9. The automatic lemon squeezer that does not require the user's force to squeeze lemons of claim 1, wherein the press support is made of metal.

* * * * *